United States Patent
Pan et al.

(10) Patent No.: US 12,380,588 B2
(45) Date of Patent: Aug. 5, 2025

(54) MAP OPTIMIZING METHOD, RELATED ELECTRONIC DEVICE AND NON-TRANSITORY COMPUTER READABLE STORAGE MEDIUM

(71) Applicant: HTC Corporation, Taoyuan (TW)

(72) Inventors: Kuang-Yu Pan, Taoyuan (TW); WanLing Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 575 days.

(21) Appl. No.: 17/819,948

(22) Filed: Aug. 16, 2022

(65) Prior Publication Data

US 2023/0222682 A1 Jul. 13, 2023

Related U.S. Application Data

(60) Provisional application No. 63/269,264, filed on Mar. 14, 2022, provisional application No. 63/298,223, filed on Jan. 11, 2022.

(51) Int. Cl.
*G06K 9/00* (2022.01)
*G06T 7/00* (2017.01)
(Continued)

(52) U.S. Cl.
CPC ............ *G06T 7/70* (2017.01); *G06T 7/50* (2017.01); *G06T 7/55* (2017.01); *G06T 7/97* (2017.01);
(Continued)

(58) Field of Classification Search
CPC .... G06T 7/20; G06T 7/30; G06T 7/50; G06T 7/55; G06T 7/579; G06T 7/70; G06T 7/73; G06T 7/74; G06T 7/77; G06T 7/80; G06T 7/97; G06T 11/00; G06T 19/00; G06T 19/003; G06T 19/006; G06T 19/20; G06T 2207/30204; G06T 2207/30244; G06F 3/011; G06F 3/012; G06F 3/014; G06F 3/03; G06F 3/0304; G06F 3/0317;
(Continued)

(56) References Cited

U.S. PATENT DOCUMENTS 10,659,768 B2 * 5/2020 Feng ................. G06T 7/579
11,017,545 B2 * 5/2021 Wang ................. G06T 7/74
(Continued)

*Primary Examiner* — Eric Rush
(74) *Attorney, Agent, or Firm* — CKC & Partners Co., LLC

(57) ABSTRACT

A map optimizing method, applicable to an electronic device storing distance values and a map, includes: identifying, from the map, a first map point with a first estimated coordinate and a second map point with a second estimated coordinate generated based on a first marker and a second marker, respectively; generating, according to the first and second estimated coordinates, virtual cameras controlled by a virtual pose and with optical axes intersected at first and second intersection coordinates separated from each other by one of the distance values, in which the virtual cameras provide virtual frames indicating that the first and second markers are observed at the first and second intersection coordinates, respectively; and performing a global bundle adjustment to optimize the map, including adjusting the first and second estimated coordinates to reduce a sum of re-projection errors calculated according to real keyframes and the virtual frames.

20 Claims, 9 Drawing Sheets

(51) Int. Cl.
  *G06T 7/50* (2017.01)
  *G06T 7/55* (2017.01)
  *G06T 7/70* (2017.01)
  *G06V 10/22* (2022.01)
  *G06V 10/24* (2022.01)
  *G06V 20/20* (2022.01)
  *H04N 13/111* (2018.01)

(52) U.S. Cl.
  CPC .......... *G06V 10/225* (2022.01); *G06V 10/245* (2022.01); *G06V 20/20* (2022.01); *H04N 13/111* (2018.05); *G06T 2207/30204* (2013.01); *G06T 2207/30244* (2013.01)

(58) Field of Classification Search
  CPC ...... G06F 3/0321; G06V 10/10; G06V 10/22; G06V 10/225; G06V 10/24; G06V 10/245; G06V 10/25; G06V 10/255; G06V 10/98; G06V 20/10; G06V 20/20; G06V 20/40; G06V 20/46; G06V 20/56; G02B 27/0012; G02B 27/0025; G02B 27/0093; G02B 27/01; G05D 1/0231; G05D 1/0234; G05D 1/0246; G05D 1/0251; G01S 7/4808; H04N 13/10; H04N 13/106; H04N 13/111; H04N 13/117; H04N 13/128; H04N 13/156; H04N 13/20; H04N 13/275; H04N 13/279; H04N 13/282
  USPC ....... 382/100, 103, 104, 106, 107, 113, 151, 382/153, 154, 173, 174, 203, 205, 206, 382/276, 285–287, 291, 293–295, 382/302–304, 325; 345/8, 418–421, 423, 345/424, 427, 428, 581, 586, 619, 625, 345/629, 632, 633; 348/46, 47, 50, 61, 348/94, 95, 113–116, 135, 139, 142, 143, 348/159; 701/26, 28, 400, 408, 409, 411, 701/445, 450, 467, 469, 491
  See application file for complete search history.

(56) References Cited

U.S. PATENT DOCUMENTS 11,158,087 B2 * 10/2021 Thyagharajan ........... G06T 7/73
2019/0012804 A1 * 1/2019 Wang ........................ G06T 7/74

* cited by examiner

MAP OPTIMIZING METHOD, RELATED ELECTRONIC DEVICE AND NON-TRANSITORY COMPUTER READABLE STORAGE MEDIUM

RELATED APPLICATIONS

This application claims priority to U.S. Provisional Application Ser. No. 63/298,223, filed Jan. 11, 2022, and U.S. Provisional Application Ser. No. 63/269,264, filed Mar. 14, 2022, which are herein incorporated by reference in their entirety.

BACKGROUND

Technical Field

The present disclosure relates to inside-out tracking technique. More particularly, the present disclosure relates to a map optimizing method, a related electronic device and non-transitory computer readable storage medium.

Description of Related Art

Inside-out tracking is a method of positional tracking commonly used in virtual reality (VR) and related technologies, for tracking the positions of the head-mounted device (HMD) and the controllers. In inside-out tracking, the required sensors (e.g., the cameras) are mounted on the HMD, while the outside-in tracking requires sensors placed in stationary locations (e.g., the infrared light houses). Inside-out tracking may be achieved through visual simultaneous localization and mapping (SLAM). SLAM uses images captured by cameras on the HMD to obtain depth information of the real-world environment so as to build a point cloud map. The point cloud map can be used by the HMD to render the virtual environment, track the place for placing the virtual object and/or perform self-positioning. However, the point cloud map is prone to have map drift caused by errors accumulated during the generation of the map.

SUMMARY

The disclosure provides a map optimizing method applicable to an electronic device configured to store a plurality of distance values and a map. The map optimizing method includes the following operations: identifying, from the map, a first map point with a first estimated coordinate and a second map point with a second estimated coordinate generated based on a first marker and a second marker, respectively; generating, according to the first estimated coordinate and the second estimated coordinate, a plurality of virtual cameras controlled by a virtual pose and with optical axes intersected at a first intersection coordinate and a second intersection coordinate separated from each other by a first distance value of the plurality of distance values, in which the plurality of virtual cameras provide a plurality of virtual frames indicating that the first marker and the second marker are observed at the first intersection coordinate and the second intersection coordinate, respectively; and performing a global bundle adjustment to optimize the map, including adjusting the first estimated coordinate and the second estimated coordinate to reduce a sum of re-projection errors calculated according to a plurality of real keyframes and the plurality of virtual frames, in which the electronic device is configured to perform positioning according to the optimized map.

The disclosure provides an electronic device including a storage circuit and a computing circuit. The storage circuit is configured to store a plurality of distance values and a map. The computing circuit is configured to: Identify, from the map, a first map point with a first estimated coordinate and a second map point with a second estimated coordinate generated based on a first marker and a second marker, respectively; generate, according to the first estimated coordinate and the second estimated coordinate, a plurality of virtual cameras controlled by a virtual pose and with optical axes intersected at a first intersection coordinate and a second intersection coordinate separated from each other by a first distance value of the plurality of distance values, in which the plurality of virtual cameras provide a plurality of virtual frames indicating that the first marker and the second marker are observed at the first intersection coordinate and the second intersection coordinate, respectively; and perform a global bundle adjustment to optimize the map, including adjusting the first estimated coordinate and the second estimated coordinate to reduce a sum of re-projection errors calculated according to a plurality of real keyframes and the plurality of virtual frames, in which the electronic device is configured to perform positioning according to the optimized map.

The disclosure provides a non-transitory computer readable storage medium storing a plurality of computer readable instructions for controlling an electronic device. The electronic device includes a computing circuit and a storage circuit configured to store a plurality of distance values and a map. The plurality of computer readable instructions, when being executed by the computing circuit, causing the computing circuit to perform: identifying, from the map, a first map point with a first estimated coordinate and a second map point with a second estimated coordinate generated based on a first marker and a second marker, respectively; generating, according to the first estimated coordinate and the second estimated coordinate, a plurality of virtual cameras controlled by a virtual pose and with optical axes intersected at a first intersection coordinate and a second intersection coordinate separated from each other by a first distance value of the plurality of distance values, in which the plurality of virtual cameras provide a plurality of virtual frames indicating that the first marker and the second marker are observed at the first intersection coordinate and the second intersection coordinate, respectively; and performing a global bundle adjustment to optimize the map, including adjusting the first estimated coordinate and the second estimated coordinate to reduce a sum of re-projection errors calculated according to a plurality of real keyframes and the plurality of virtual frames, in which the electronic device is configured to perform positioning according to the optimized map.

It is to be understood that both the foregoing general description and the following detailed description are by examples, and are intended to provide further explanation of the disclosure as claimed.

DETAILED DESCRIPTION

Figure 1:
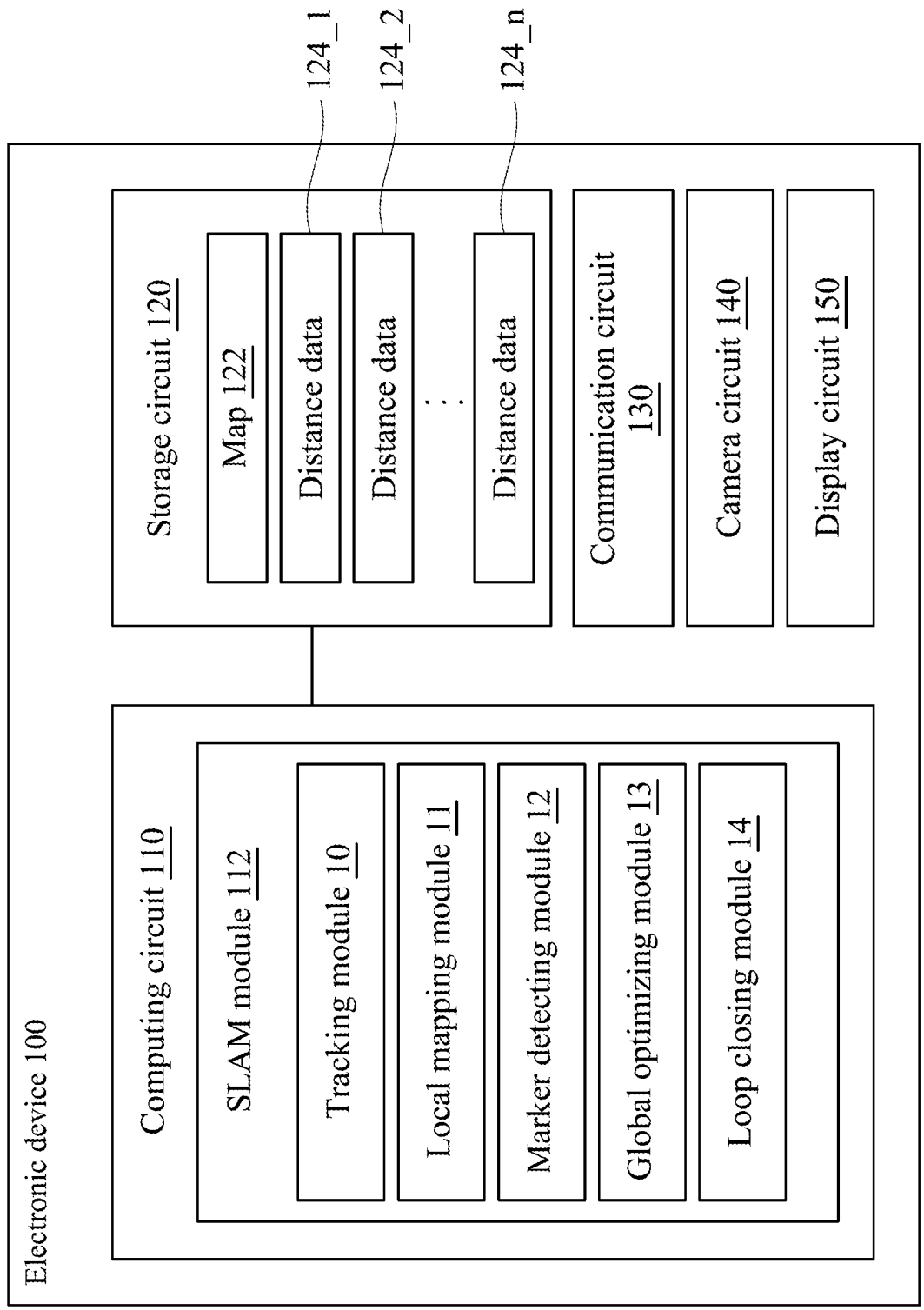
FIG. 1 is a simplified functional block diagram of an electronic device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of an electronic device 100 according to one embodiment of the present disclosure. The electronic device 100 includes a computing circuit 110, a storage circuit 120, a communication circuit 130, a camera circuit 140 and a display circuit 150. The computing circuit 110 includes a simultaneous localization and mapping (SLAM) module 112. In some embodiments, the SLAM module 112 is configured to build a three-dimensional (3D) point cloud map 122 (hereinafter referred to as the "map 122"), in which the map 122 may be stored in the storage circuit 120. The computing circuit 110 may use the camera circuit 140 to capture real-world features and identify these features by information stored in the map 122, so as to determine a precise position of the electronic device 100 by inside-out tracking technique.

In some embodiments, the electronic device 100 includes an optical see-through system and/or a video see-through system for providing augmented reality (AR) environment. An optical see-through system may allow actual direct viewing of a real-world environment (e.g., via transparent lenses) and may, at the same time, project images of a virtual object into the visual field of the user (e.g., by the display circuit 150) thereby augmenting the real-world environment perceived by the user with the virtual object. A video see-through system captures images of the real-world environment (e.g., by the camera circuit 140) and provide these images to the user (e.g., by the display circuit 150) to allow in-direct viewing of the real-world environment and may, at the same time, overlay images of the virtual objects onto the images of the real-world environment. In some embodiments, the electronic device 100 is capable of providing totally immersive virtual reality (VR) environment to the user (e.g., by the display circuit 150).

The map 122 may be used by the computing circuit 110 to render the virtual environment and/or the virtual object, for example, a virtual apartment with virtual furniture rendered based on an actual apartment of the user. In some embodiments, the electronic device 100 is a standalone head-mounted device (HMD) that all required hardware components are integrated in a single device. In other embodiments, part of the communication circuit 130, the camera circuit 140 and the display circuit 150 may be integrated in the HMD, while the computing circuit 110, the storage circuit 120 and another part of the communication circuit 130 are implemented in a device with capability of logic computing, such as a personal computer, a laptop computer or the like. The two parts of the communication circuit 130 may communicate through wire or wireless means.

In some embodiments, the computing circuit 110 may include one or more processors (e.g., one or more general purpose single-chip or multi-chip processors), digital signal processors (DSPs), application specific integrated circuits (ASICs), field programmable gate arrays (FPGAs), other programmable logic devices or any combination thereof. The camera circuit 140 comprises one or more cameras that may be mounted on the HMD. The display circuit 150 may be realized by a see-through holographic display, a liquid crystal display (LCD), an active-matrix organic LED (AMOLED) display or the like.

Figure 2:
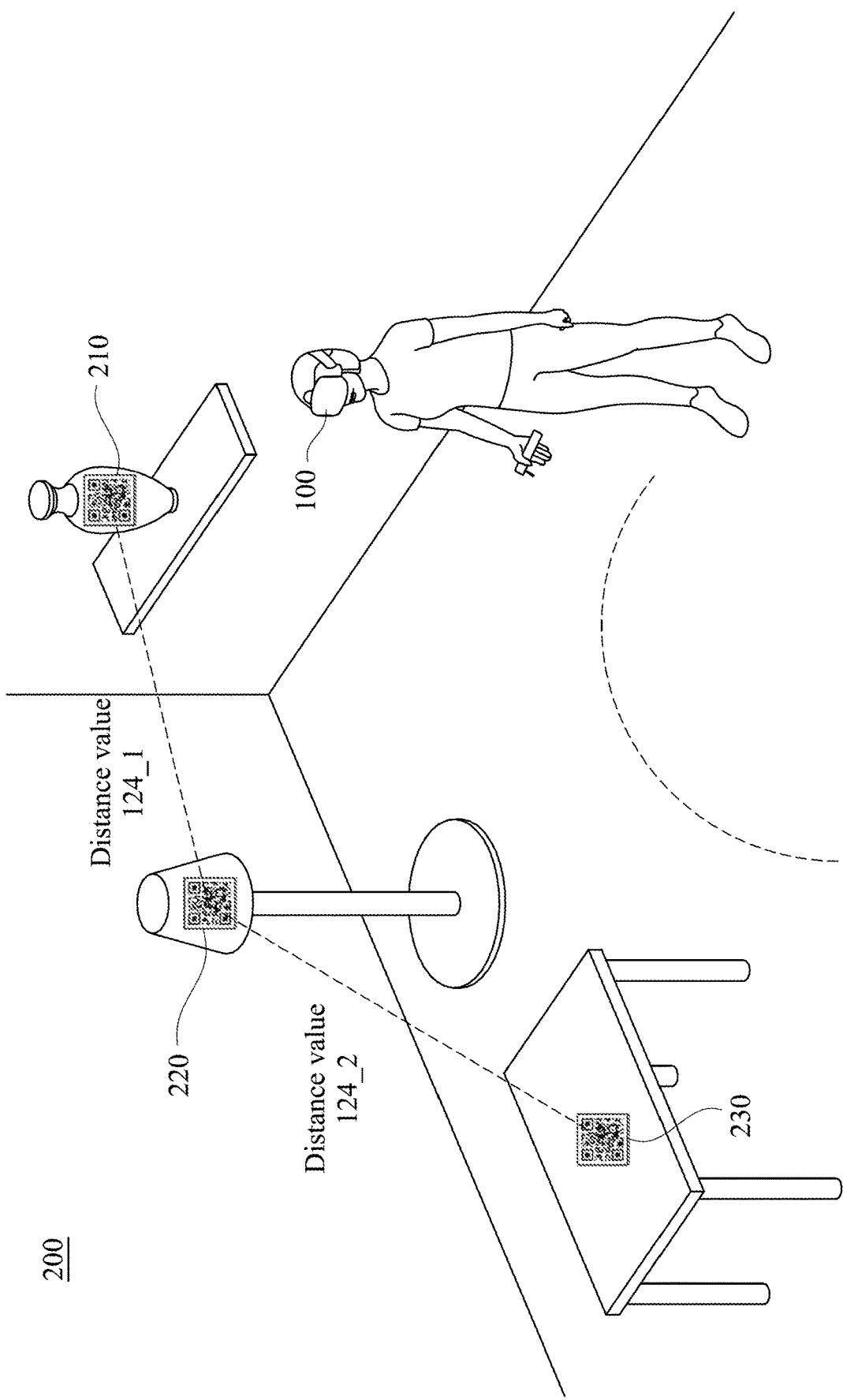
FIG. 2 is a schematic diagram of a real-world environment according to one embodiment of the present disclosure.

Reference is made to FIG. 1 and FIG. 2, in which FIG. 2 is a schematic diagram of a real-world environment 200 according to one embodiment of the present disclosure. The usual map building techniques like the binocular depth estimation and the monocular depth estimation may have low precision when estimating a feature with a long distance, and therefore the map 122 may be generated by performing multiple times of short-range local mapping in some embodiments. For generating the map 122 of the environment 200, the electronic device 100 may prompt the user wearing the HMD to move in the environment 200 to capture a plurality of images by the camera circuit 140. A tracking module 10 of the SLAM module 112 is configured to identify preset types of real-world features from the captured images. In some embodiments, the preset types of real-world features may include a plurality of markers 210-230, boundaries and corners of furniture and/or household appliances, etc., but this disclosure is not limited in this regard.

The images captured by the camera circuit 140 are referred to as "frames" in the following paragraphs. One or more frames that are captured by the camera circuit 140 at a certain instant may be selected to form a "keyframe," in which the keyframe includes a six-dimensional (6D) camera pose of the camera circuit 140 at the certain instant. The identification of the real-world features performed by the tracking module 10 is for selecting the frame(s) for forming the keyframe. In addition, a local mapping module 11 of the SLAM module 112 may generate map points of the map 122 based on the keyframes.

In some embodiments, the markers 210-230 may be one-dimensional barcodes, two-dimensional barcodes or any combination thereof.

Figure 3:
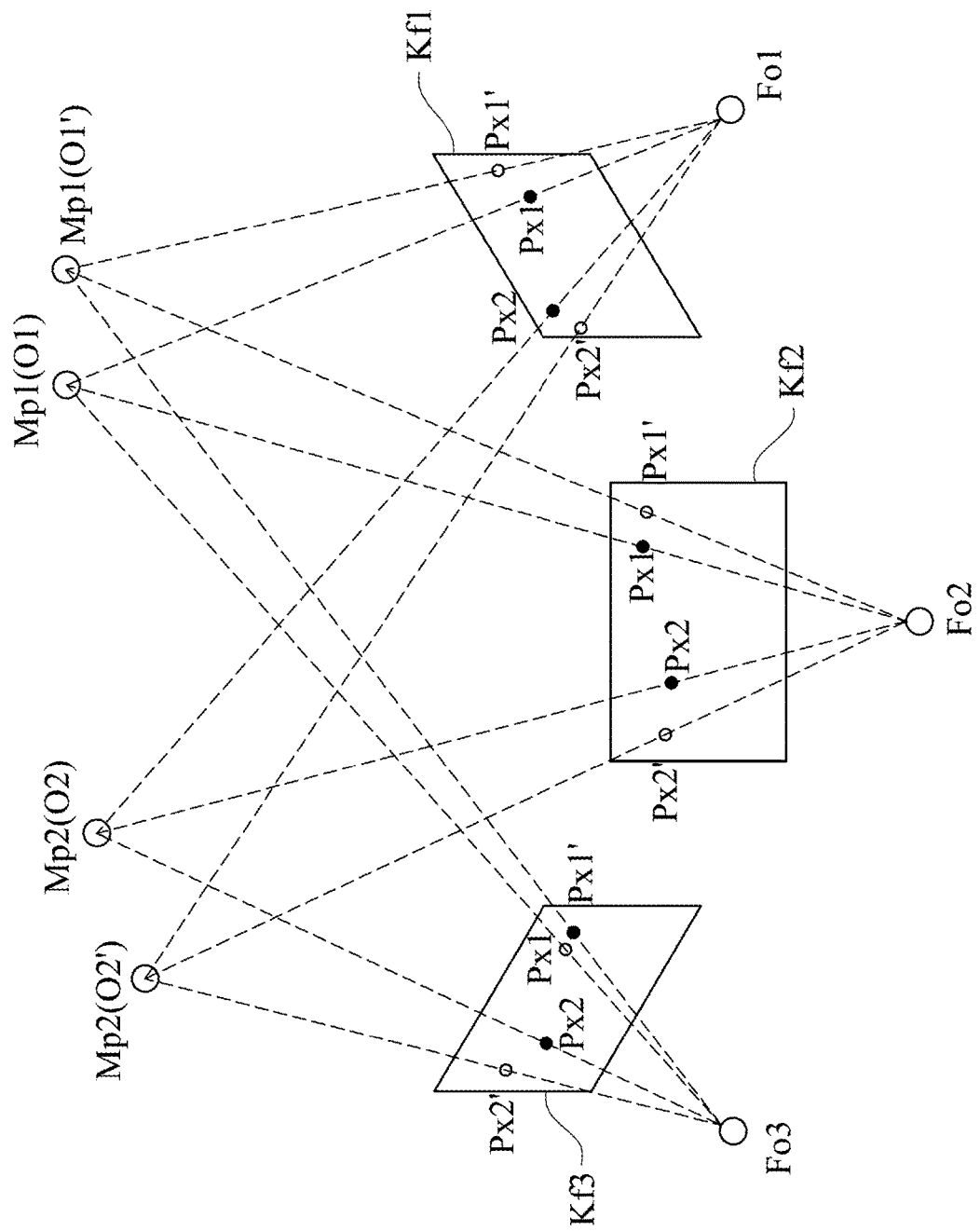
FIG. 3 is a schematic diagram of local mapping according to one embodiment of the present disclosure.

FIG. 3 is a schematic diagram of local mapping according to one embodiment of the present disclosure. When the user moves in the environment 200, 6D camera poses Fo1-Fo3 of the camera circuit 140 (hereinafter referred to as "camera poses Fo1-Fo3") are stored in the storage circuit 120. Real keyframes Kf1-Kf3 are captured by the camera circuit 140 at camera poses Fo1-Fo3, respectively. For convenience of explanation, each of the real keyframes Kf1-Kf3 is represented by one frame thereof, but this disclosure is not limited in this regard. Markers 210-220 of FIG. 2 are respectively recorded as pixel points Px1-Px2 in the real keyframes Kf1-Kf3. In the ideal situation, the local mapping module 11 can generate map points Mp1-Mp2 respectively corresponding to the markers 210-220, based on the camera poses Fo1-Fo3 and the real keyframes Kf1-Kf3. Since the focal length(s) of the camera circuit 140, the camera poses Fo1-Fo3 and pixel coordinates of the pixel points Px1-Px2 in the image planes are known parameters to the electronic device 100, the local mapping module 11 can calculate three-dimensional (3D) ideal coordinates O1-O2 of the map points Mp1-Mp2 by triangulation.

However, mechanical errors of the gyroscope, the accelerometer, the motor, etc. and noises in the real keyframes Kf1-Kf3 affect the local mapping. As such, in the practical situation, the local mapping module 11 generates the map points Mp1-Mp2 with 3D estimated coordinates O1'-O2' according to the camera poses Fo1-Fo3 and the real keyframes Kf1-Kf3, in which the estimated coordinates O1'-O2' may deviate from the ideal coordinates O1-O2. The deviation of the estimated coordinates O1'-O2' from the ideal coordinates O1-O2 may be observed by projecting the estimated coordinates O1'-O2' onto the real keyframes Kf1-Kf3 to form a plurality of projection points Px1'-Px2' corresponding to the estimated coordinates O1'-O2', respectively. The local mapping module 11 may perform local bundle adjustment to adjust the estimated coordinates O1'-O2' and the stored camera poses Fo1-Fo3 so as to reduce linear distance between the pixel points Px1-Px2 and the projection points Px1'-Px2' in each of the real keyframes Kf1-Kf3 (i.e., reducing the re-projection errors of the map points Mp1-Mp2). In specific, for performing the local bundle adjustment, the re-projection errors of map points Mp1-Mp2 may be described by a function of the non-linear least-squares problem. The Gauss-Newton algorithm may be used to find the increment to adjust each estimated coordinate to reduce the output of such function (i.e., the re-projection errors). After multiple times of iterations, when the re-projection error is small enough, the estimated coordinates O1'-O2' are sufficiently optimized.

During multiple times of local mapping, the local mapping module 11 may generate general map points that are, for example, generated based on the boundaries and corners of furniture and/or household appliances, that is, the general map points do not generated based on the markers 210-230. The pixel points corresponding to the general map points are omitted from the real keyframes Kf1-Kf3, for the sake of brevity. In addition, the local mapping module 11 also reduces the re-projection errors of the general map points during the local bundle adjustment.

Figure 4:
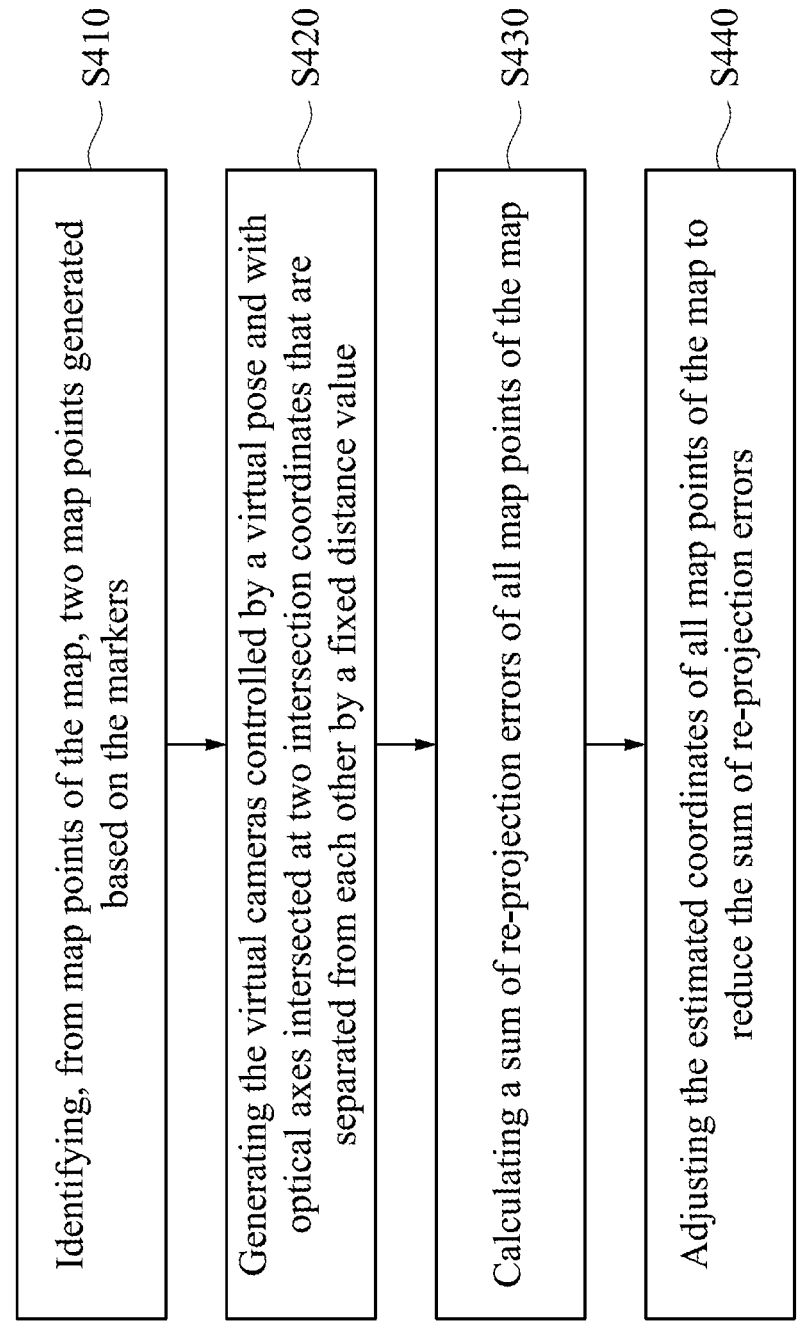
FIG. 4 is a flowchart of a map optimizing method according to one embodiment of the present disclosure.

FIG. 4 is a flowchart of a map optimizing method 400 according to one embodiment of the present disclosure. After multiple times of local mapping, the SLAM module 112 may reduce drift of the entire map 122 by performing the map optimizing method 400 that includes the global bundle adjustment. Any combination of the features of the map optimizing method 400 or any of the other methods described herein may be embodied in instructions stored in a non-transitory computer readable storage medium. When executed (e.g., by the computing circuit 110), the instructions may cause some or all of such methods to be performed. It will be understood that any of the methods discussed herein may include greater or fewer operations than illustrated in the flowchart and the operations may be performed in any order, as appropriate.

The map optimizing method 400 optimizes the map 122 by utilizing a plurality of distance values 124_1-124_n stored in the storage circuit 120 of FIG. 1. Each of the distance values 124_1-124_n represents a real-world distance between two markers. For example, the distance values 124_1 may represent that the marker 210 and the marker 220 are separated from each other by 150 cm in the environment 200. In some embodiments, the distance values 124_1-124_n may be inputted by the user through any suitable user interface into the electronic device 100. In other embodiments, the distance values 124_1-124_n are generated by devices with the markers attached therewith and then transmitted to the electronic device 100, in which these devices may measure distance between each other by time-of-flight (ToF) technique based on Wi-Fi, Bluetooth low energy (BLE), ultrasonic sound wave, ZigBee or any combination thereof.

Figure 5:
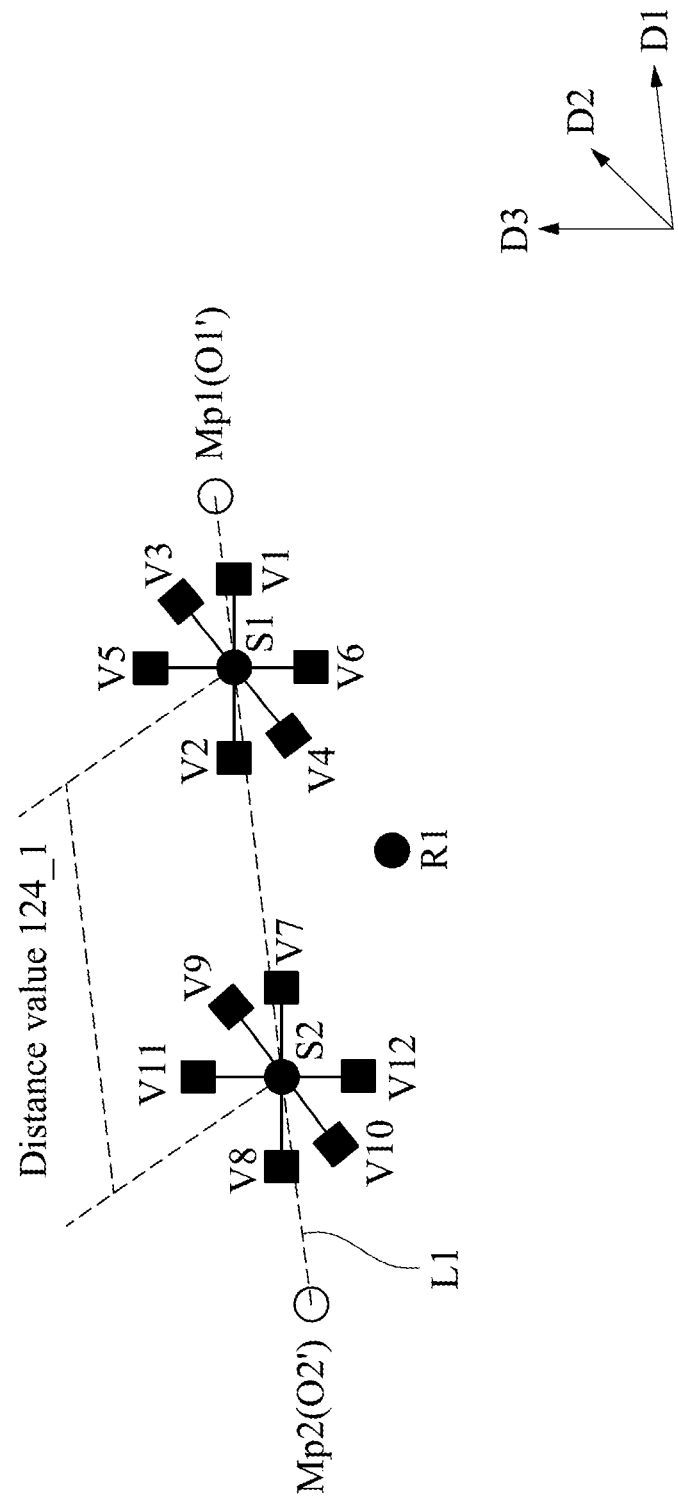
FIG. 5 is a schematic diagram of a constraint used in the map optimizing method, according to one embodiment of the present disclosure.

Reference is made to FIG. 4 and FIG. 5, where FIG. 5 is a schematic diagram of a constraint used in the map optimizing method 400, according to one embodiment of the present disclosure. In operation 410, a marker detecting module 12 of the SLAM module 112 identifies, from the plurality of map points of the map 122, two map points generated based on the markers. For example, the map points Mp1-Mp2 generated according to the markers 210-220, respectively, are identified from the map 122.

In operation 420, a global optimizing module 13 of the SLAM module 112 generates a plurality of virtual cameras V1-V12 for optimizing the estimated coordinates O1'-O2'. The virtual cameras V1-V12 are regarded as real cameras in the later described global bundle adjustment, that is, the information pertain to the virtual cameras V1-V12 and the information from the camera circuit 140 are used in similar ways in global bundle adjustment.

Optical axes of the virtual cameras V1-V6 are set to intersect at an intersection coordinate S1. Optical axes of the virtual cameras V7-V12 are set to intersect at an intersection coordinate S2. In specific, the virtual cameras V1-V2 are arranged face-to-face along a direction D1; the virtual cameras V3-V4 are arranged face-to-face along a direction D2; and the virtual cameras V5-V6 are arranged face-to-face along a direction D3. The virtual cameras V7-V8 are arranged face-to-face along a direction D1; the virtual cameras V9-V10 are arranged face-to-face along a direction D2; and the virtual cameras V11-V12 are arranged face-to-face along a direction D3. In some embodiments, the directions D1-D3 are perpendicular to each other, but this disclosure is not limited thereto. The virtual cameras V1-V12 have fixed relative position relationships with each other, and shares a 6D virtual pose R1. Therefore, the virtual cameras V1-V12 may move and/or rotate along with the virtual pose R1 when the virtual pose R1 is adjusted in the global bundle adjustment, that is, the virtual pose R1 is configured to control the arrangement of the virtual cameras V1-V12.

Figure 6:
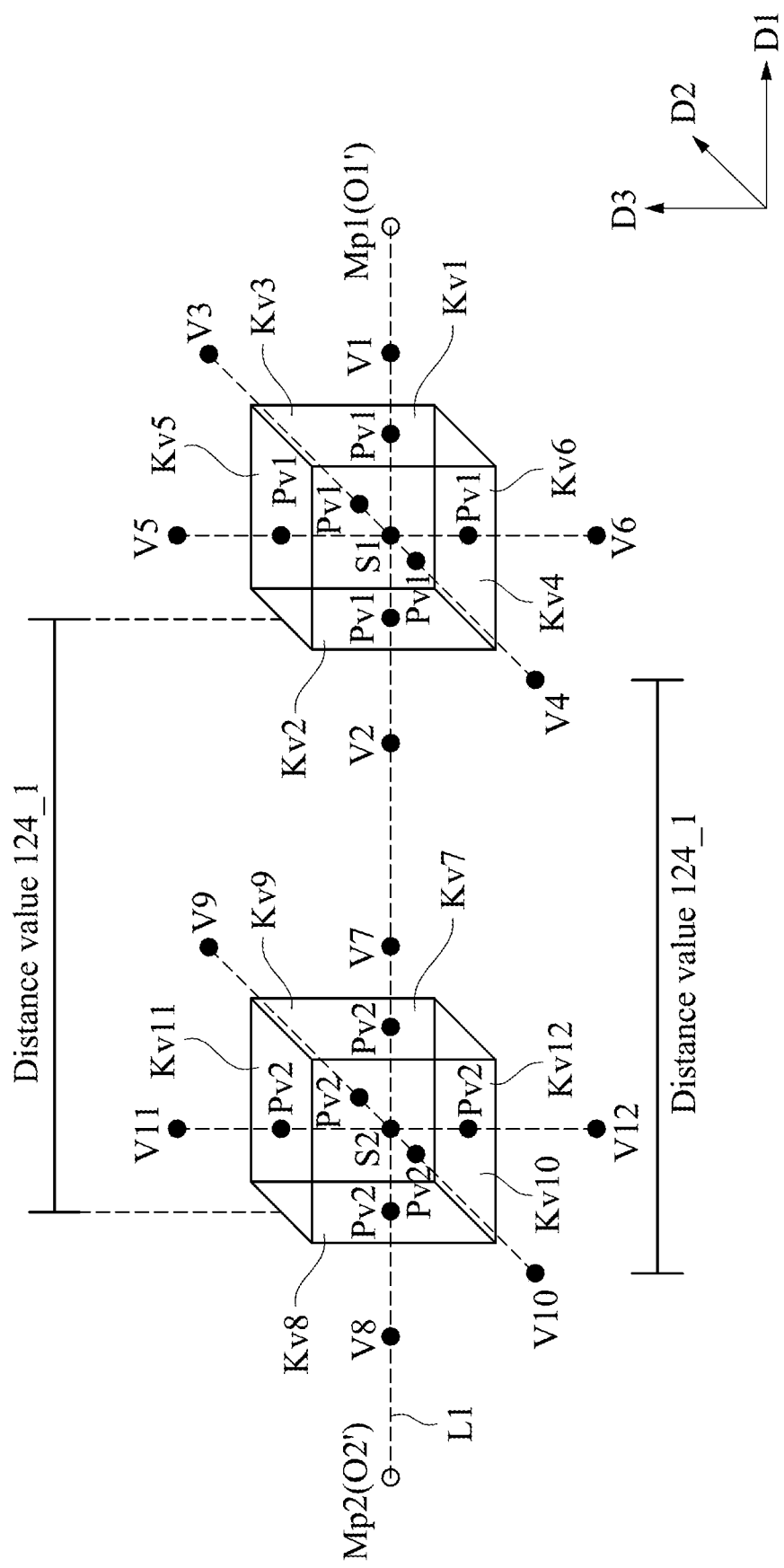
FIG. 6 is a schematic diagram of virtual frames provided by the virtual cameras, according to one embodiment of the present disclosure.

Reference is made to FIG. 6, in which FIG. 6 is a schematic diagram of virtual frames Kv1-Kv12 provided by the virtual cameras V1-V12, according to one embodiment of the present disclosure. The virtual frames Kv1-Kv12 can be regarded as generated by the virtual cameras V1-V12 at the virtual pose R1, and form a virtual keyframe of the virtual cameras V1-V12 that will be used in the global bundle adjustment. The virtual frames Kv1-Kv6 provided by the virtual cameras V1-V6 forms a cube accommodating the intersection coordinate S1, in which the intersection coordinate S1 is the center of such cube in some embodiments. The virtual frames Kv1-Kv6 are configured to indicate the global bundle adjustment algorithm that the marker 210 is observed by the virtual cameras V1-V6 at the intersection coordinate S1. In specific, six pixel points Pv1 corresponding to the marker 210 are formed at intersections of the virtual frames Kv1-Kv6 and imaginary straight lines from positions of the virtual cameras V1-V6 to the intersection coordinate S1.

Similarly, the virtual frames Kv7-Kv12 provided by the virtual cameras V7-V12 forms a cube accommodating the intersection coordinate S2, in which the intersection coordinate S2 is the center of such cube in some embodiments. The virtual frames Kv7-Kv12 are configured to indicate the global bundle adjustment algorithm that the marker 220 is observed by the virtual cameras V7-V12 at the intersection coordinate S2. In specific, six pixel points Pv2 corresponding to the marker 220 are formed at intersections of the virtual frames Kv7-Kv12 and imaginary straight lines from positions of the virtual cameras V7-V12 to the intersection coordinate S2.

A distance between the intersection coordinates S1-S2 is set to the distance value 124_1 (i.e., the distance between the markers 210-220), and remains the same during the global bundle adjustment. As such, a constraint that correctly indicates the real-world distance between the markers 210-220 is introduced into the global bundle adjustment to help to optimize the estimated coordinates O1'-O2'. In some embodiments, when the virtual cameras V1-V12 are initially generated, the intersection coordinates S1-S2 and the estimated coordinates O1'-O2' are aligned with each other in an imaginary straight line L1. In some embodiments, when the virtual cameras V1-V12 are initially generated, the intersection coordinates S1-S2 are placed between the estimated coordinates O1'-O2', in which a distance from the estimated coordinate O1' to the intersection coordinate S1 equals to a distance from the estimated coordinate O2' to the intersection coordinate S2.

As shown in FIG. 6, in some embodiments, to maintain the intersection coordinate S1 and the intersection coordinate S2 separated by the distance value 124_1, the virtual cameras facing the same direction are set to be separated by the distance value 124_1, or the virtual frames facing the same direction are set to be separated by the distance value 124_1. For example, the virtual cameras V4 and V10 facing the second direction D2 are separated by the distance value 124_1. As another example, the virtual frames Kv2 and Kv8 facing the first direction D1 are separated by the distance value 124_1.

Figure 7:
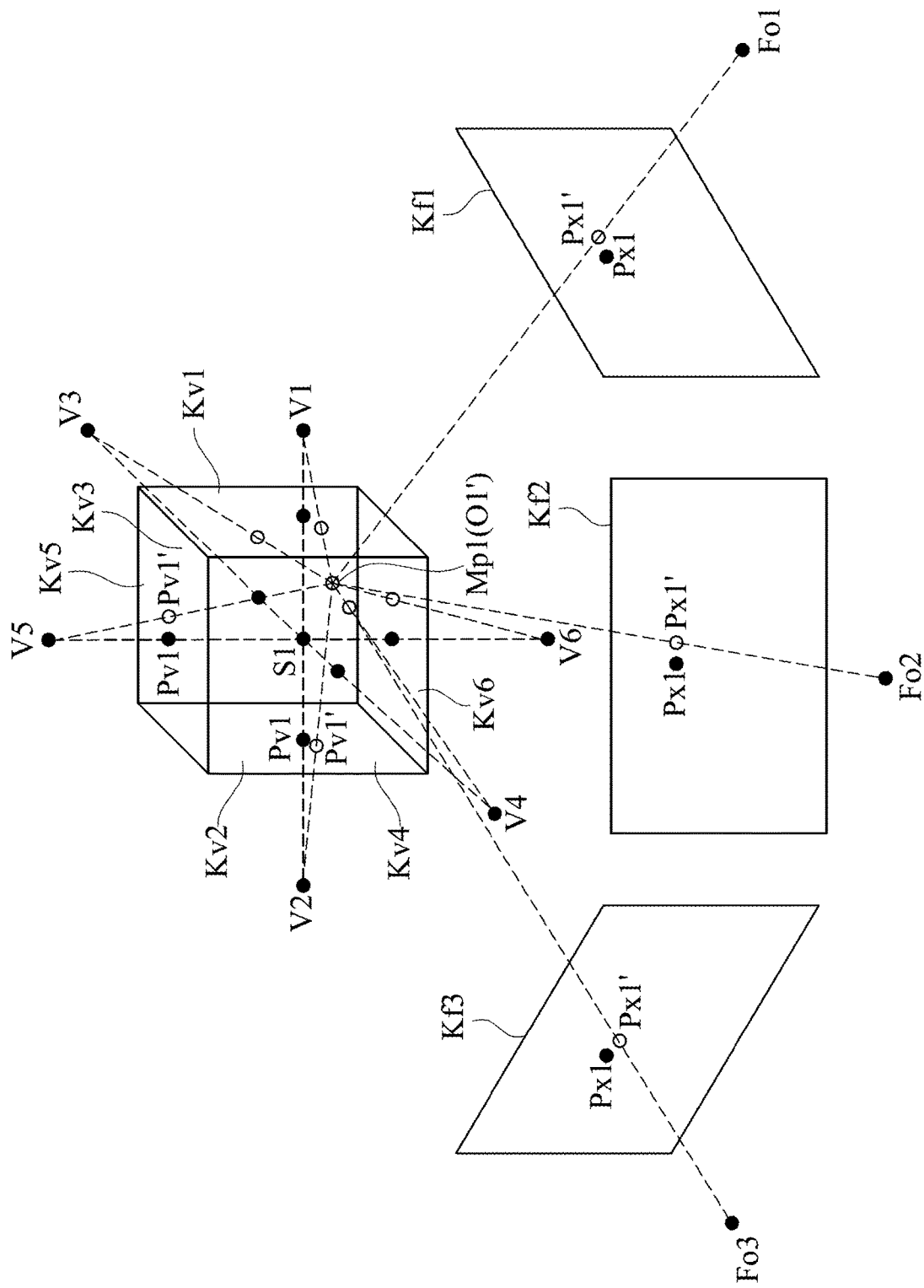
FIG. 7 is a schematic diagram for illustrating the calculation of a sum of re-projection errors, according to one embodiment of the present disclosure.

Reference is made to FIG. 4 and FIG. 7, where FIG. 7 is a schematic diagram for illustrating the calculation of a sum of re-projection errors, according to one embodiment of the present disclosure. In operations S430-440, the global optimizing module 13 performs the global bundle adjustment. In operation S430, the sum of re-projection errors of all map points of the map 122 is calculated. It is worth mentioning that the global optimizing module 13 does not generate virtual cameras for the general map points that do not generated based on the markers 210-230. The re-projection errors of these general map points relate to the observation of the camera circuit 140, but do not relate to the observations of the virtual cameras. A person having ordinary skill in the art will appreciate the means for calculating the re-projection errors of the general map points, and thus the detailed descriptions are omitted herein, for the sake of brevity. The following paragraphs will explain how to calculate the re-projection errors of the map points that are generated based on the markers 210-230 (e.g., the map points Mp1 and Mp2 identified in operation S410).

Take the calculation of the re-projection errors of the map point Mp1 as an example. As shown in FIG. 7, the global optimizing module 13 projects the estimated coordinate O1' of the map point Mp1 onto the real keyframes Kf1-Kf3 and the virtual frames Kv1-Kv6 since the real keyframes Kf1-Kf3 and the virtual frames Kv1-Kv6 include pixel points Px1 and Pv1 related to the map point Mp1. As such, the projection points Px1' are generated on the real keyframes Kf1-Kf3, and the projection points Pv1' are generated on the virtual frames Kv1-Kv6. The projection points Pv1' are represented by hollow circles in FIG. 7, where only reference characters of the pixel points Pv1 and the projection points Pv1' on the virtual frames Kv2 and Kv5 are shown in FIG. 7, for the sake of brevity. Then, the global optimizing module 13 calculates the re-projection errors (i.e., the linear distances) between each pixel point Px1 and a corresponding projection point Px1' on the same real keyframe, and also calculates the re-projection errors between each pixel point Pv1 and a corresponding projection point Pv1' on the same virtual frame.

Since the re-projection errors of the map points Mp1-Mp2 can be calculated in similar manner, the estimated coordinate O2' of the map point Mp2 and the corresponding virtual frames V7-V12 are omitted from FIG. 7, for the sake of brevity. In short, the re-projection errors of the map point Mp2 are calculated by projecting the estimated coordinate O2' onto the real keyframes Kf1-Kf3 and the virtual frames V7-V12 including the pixel points Px2 and Pv2 related to the map point MP2, so as to generate a plurality of projection points. Then, the global optimizing module 13 calculates the re-projection errors between each pixel point Px2 and a corresponding projection point on the same real keyframe, and also calculates the re-projection errors between each pixel point Pv2 and a corresponding projection point on the same virtual frame.

The global optimizing module 13 may add the re-projection errors of the map point Mp1, the re-projection errors of the map point Mp2 and the re-projection errors of the other map points (e.g., the general map points) to generate the sum of re-projection errors. In other words, the global optimizing module 13 may add re-projection errors of all map points of the map 122 to generate the sum of re-projection errors.

In operation S440, the sum of re-projection errors is reduced by adjusting the estimated coordinates of all map points of the map 122, including adjusting the estimated coordinates O1'-O2'. The sum of re-projection errors may be presented as a function of the non-linear least-squares problem. The Gauss-Newton algorithm may be used to find the increment to adjust each estimated coordinate to reduce the output of such function (i.e., the sum of re-projection errors).

Operations S430-S440 may be repeated for multiple times until the sum of re-projection errors is less than or equal to a preset threshold stored in the storage circuit 120. As can be seen from FIG. 6 and FIG. 7, the estimated coordinate O1' is encouraged to approach to the intersection coordinate S1 during operations S430-S440 since the intersection coordinate S1 is the position that minimizes the re-projection errors on the virtual frames Kv1-Kv6. Similarly, the estimated coordinate O2' is encouraged to approach to the intersection coordinate S2 to minimize the re-projection errors on the virtual frames Kv7-Kv12. As a result, the distance between the estimated coordinates O1'-O2' will be constrained to approximate to the distance value 124_1 after multiple times of iteration.

In some embodiments, the camera poses Fo1-Fo3 and the virtual pose R1 are adjusted in operation S440 to reduce the sum of re-projection errors. It is appreciated that the projection point is placed at the intersection of the keyframe and the imaginary line from the pose to the estimated coordinate, and therefore adjusting either or both of the poses and the estimated coordinates help to reduce the re-projection error.

It is worth mentioning that the general map points that are generated according to real-world features other than the markers 210-230 are prone to errors accumulated during the local mapping, and are hard to be adjusted to precise positions through traditional global bundle adjustment algorithm because of lacking of accurate real-world constraints, such as lacking of precise distance information and/or depth information of the real world. By conducting the map optimizing method 400 and the global bundle adjustment included therein, the real-world constraint (e.g., the distance value 124_1) makes the distance between the map points Mp1-Mp2 substantially equal to the real distance between the markers 210-220 of the environment 200. Since the map points in the map 122 are related to each other, optimizing the positions of the map points Mp1-Mp2 will render the positions of adjacent map points be optimized correspondingly. Therefore, through the map 122, the electronic device 100 can perform precise in-door positioning, and/or can render a virtual environment that precisely matches the real-world environment.

Figure 8:
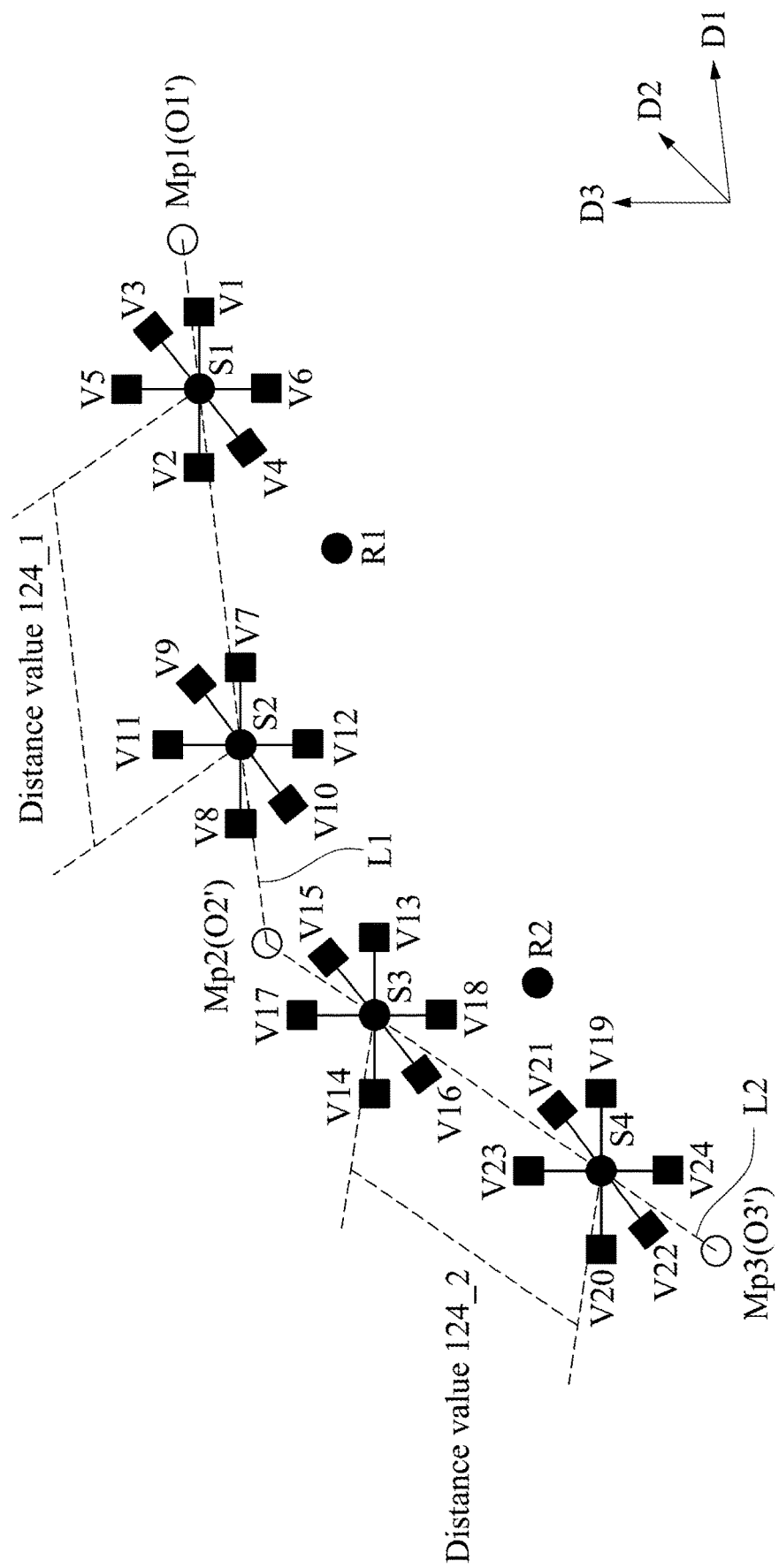
FIG. 8 is a schematic diagram of a plurality of constraints used in the map optimizing method, according to one embodiment of the present disclosure.

Reference is made to FIG. 8, in which FIG. 8 is a schematic diagram of a plurality of constraints used in the map optimizing method 400, according to one embodiment of the present disclosure. In some embodiments, operation S410 may be performed for multiple times to generate a plurality of sets of virtual cameras according to the distance values 124_1-124_n, in which the aforementioned virtual cameras V1-V12 is a set of the plurality of sets of virtual cameras. Each set of virtual cameras is controlled by (shares) a virtual pose, and is separated into two groups remained separating from each other by a corresponding one of the distance values 124_1-124_n, and each group includes six virtual cameras, similar to those described above for the virtual cameras V1-V12.

As shown in FIG. 8, for example, after the electronic device 100 generates the map points Mp1-Mp3 corresponding to the markers 210-230 through local mapping and local bundle adjustment, the global optimizing module 13 may perform operations S410-S420 for multiple times to generate the virtual cameras V1-V12 according to the distance value 124_1, and also to generate a plurality of virtual cameras V13-V24 according to the distance value 124_2. The distance value 124_2 represents a real-world distance between the markers 220-230 of FIG. 2. Therefore, the optical axes of the virtual cameras V13-V24 are set to intersect at intersection coordinates S3-S4 separated from each other by the distance value 124_2, and the virtual frames provided by the virtual cameras V13-V24 indicate the global bundle adjustment algorithm that the markers 220 and 230 are observed at the intersection coordinates S3-S4, respectively.

In some embodiments, the intersection coordinates S3-S4, the estimated coordinate O2' of the map point Mp2 and the estimated coordinate O3' of the map point Mp3 are aligned with each other in an imaginary straight line L2 when the virtual cameras V13-V24 are generated. In some embodiments, when the virtual cameras V13-V24 are generated, the intersection coordinates S3-S4 are placed between the estimated coordinate O2'-O3', and the distance between the estimated coordinate O2' and the intersection coordinate S3 equals to the distance between the estimated coordinate O3' and the intersection coordinate S4.

In some embodiments, the number of the sets of virtual cameras may be equal to the number of the distance values 124_1-124_n stored in the storage circuit 120, that is, the global optimizing module 13 may generate n sets of virtual cameras to introduce n real-world constraints (e.g., the distance values 124_1-124_n) to the global bundle adjustment algorithm to optimize the map 122, in which n is a positive integer. Operation S430-S440 may be performed by using all information provided by the multiple sets of virtual cameras.

As shown in FIG. 8, for example, the virtual cameras V13-V24 are controlled by a virtual pose R2, and the virtual poses R1 and R2 may be adjusted during operations S430-S440 to make intersection coordinates S2-S3 and the estimated coordinate O2' approach to each other so as to reduce the re-projection errors of the second map point Mp2 on the virtual frames provided by the virtual cameras V7-V12 and V13-V18.

Figure 9:
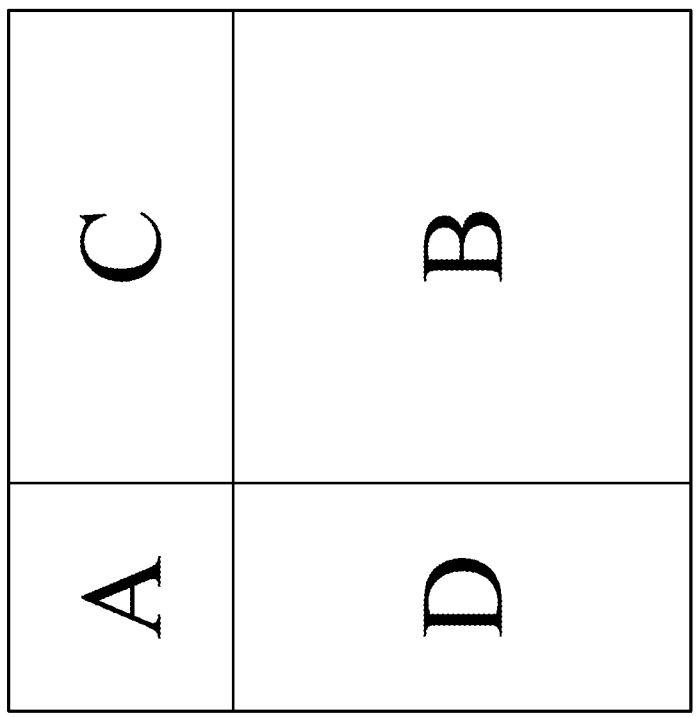
FIG. 9 is a schematic diagram of the Hessian matrix according to one embodiment of the present disclosure.

Reference is made to FIG. 9, where FIG. 9 is a schematic diagram of the Hessian matrix according to one embodiment of the present disclosure. The following formula (1) is to be solved when using Gauss-Newton algorithm in operation S440, in which "H" is the Hessian matrix, "x" is the increment and "b" is the Jacobian matrix.

$$Hx = b \quad \text{formula (1)}$$

The Hessian matrix includes sub-matrixes A, B, C and D. Since the Hessian matrix usually have a considerable scale, Schur complement is a common tool to reduce the computation complexity of formula (1), but this is only applicable to the case that the sub-matrixes A and B are diagonal matrixes. To ensure that the sub-matrixes A and B are diagonal matrixes, the map optimizing method 400 introduces real-world constraints that are keyframe to map point constraints, instead of map point to map point constraints. For example, as shown in FIG. 6, the distance value 124_1 is introduced into the global bundle adjustment algorithm by setting two corresponding virtual frames (or two corresponding positions of the virtual cameras) to be separated from each other by the distance value 124_1, instead of directly setting the intersection coordinates S1-S2 to be separated from each other by the distance value 124_1. Therefore, the map optimizing method 400 is help to generate precise 3D map and requires low calculation time.

Additionally, in some embodiments, the SLAM module 112 of FIG. 1 further includes a loop closing module 14 configured to determine whether the electronic device 100, after being moved for an arbitrary length or after a preset time, returned to a previous visited area. When loop closure is detected, the loop closing module 14 may merge new sections of the map 122 with old sections of the map 122 that have similar map points so as to reduce the deformation of the map 122.

In some embodiments, the tracking module 10, the local mapping module 11, the marker detecting module 12, the global optimizing module 13 and the loop closing module 14 each can be realized by hardware components, software or any combination thereof, as appropriate.

Certain terms are used in the specification and claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A map optimizing method, applicable to an electronic device configured to store a plurality of distance values and a map, comprising:
   identifying, from the map, a first map point with a first estimated coordinate and a second map point with a second estimated coordinate generated based on a first marker and a second marker, respectively;
   generating, according to the first estimated coordinate and the second estimated coordinate, a plurality of virtual cameras controlled by a virtual pose and with optical axes intersected at a first intersection coordinate and a second intersection coordinate separated from each other by a first distance value of the plurality of distance values, wherein the plurality of virtual cameras provide a plurality of virtual frames indicating that the first marker and the second marker are observed at the first intersection coordinate and the second intersection coordinate, respectively; and
   performing a global bundle adjustment to optimize the map, comprising adjusting the first estimated coordinate and the second estimated coordinate to reduce a sum of re-projection errors calculated according to a plurality of real keyframes and the plurality of virtual frames, wherein the electronic device is configured to perform positioning according to the optimized map.

2. The map optimizing method of claim 1, wherein the plurality of real keyframes are captured by the electronic device at a plurality of camera poses, respectively, and the plurality of camera poses are stored in the electronic device, wherein performing the global bundle adjustment to optimize the map further comprises:
   adjusting the plurality of camera poses and the virtual pose to reduce the sum of re-projection errors.

3. The map optimizing method of claim 1, wherein performing the global bundle adjustment to optimize the map further comprises calculating the sum of re-projection errors, wherein calculating the sum of re-projection errors comprises:
   projecting the first estimated coordinate onto real keyframes and virtual frames with first pixel points related to the first map point, so as to generate a plurality of first projection points;
   calculating first re-projection errors between each of the first pixel points and a corresponding one of the plurality of first projection points;
   projecting the second estimated coordinate onto real keyframes and virtual frames with second pixel points related to the second map point, so as to generate a plurality of second projection points;
   calculating second re-projection errors between each of the second pixel points and a corresponding one of the plurality of second projection points; and
   adding the first re-projection errors, the second re-projection errors and re-projection errors of other map points of the map, so as to generate the sum of re-projection errors.

4. The map optimizing method of claim 1, wherein a number of the plurality of virtual cameras is twelve, wherein optical axes of half of the plurality of virtual cameras intersect at the first intersection coordinate, and optical axes of another half of the plurality of virtual cameras intersect at the second intersection coordinate.

5. The map optimizing method of claim 1, wherein when the plurality of virtual cameras are generated, the first intersection coordinate, the second intersection coordinate, the first estimated coordinate and the second estimated coordinate are aligned with each other in an imaginary straight line.

6. The map optimizing method of claim 5, wherein when the plurality of virtual cameras are generated, a distance from the first estimated coordinate to the first intersection coordinate equals a distance from the second estimated coordinate to the second intersection coordinate.

7. The map optimizing method of claim 1, wherein the first distance value represents a real-world distance between the first marker and the second marker.

8. The map optimizing method of claim 1, wherein each of the plurality of distance values represents a real-word distance between two markers of a plurality of markers comprising the first marker and the second marker,
   wherein the electronic device is configured to generate a plurality of sets of virtual cameras, and the plurality of virtual cameras is a set of the plurality of sets of virtual cameras,
   wherein each set of the plurality of sets of virtual cameras is separated into two groups kept separated from each other by a corresponding one of the plurality of distance values while performing the global bundle adjustment, so as to introduce the plurality of distance values into the global bundle adjustment.

9. An electronic device, comprising:
   a storage circuit, configured to store a plurality of distance values and a map; and
   a computing circuit, configured to:
      identify, from the map, a first map point with a first estimated coordinate and a second map point with a second estimated coordinate generated based on a first marker and a second marker, respectively;
      generate, according to the first estimated coordinate and the second estimated coordinate, a plurality of virtual cameras controlled by a virtual pose and with optical axes intersected at a first intersection coordinate and a second intersection coordinate separated from each other by a first distance value of the plurality of distance values, wherein the plurality of virtual cameras provide a plurality of virtual frames indicating that the first marker and the second marker are observed at the first intersection coordinate and the second intersection coordinate, respectively; and
      perform a global bundle adjustment to optimize the map, comprising adjusting the first estimated coordinate and the second estimated coordinate to reduce a sum of re-projection errors calculated according to a plurality of real keyframes and the plurality of virtual frames, wherein the electronic device is configured to perform positioning according to the optimized map.

10. The electronic device of claim 9, wherein the plurality of real keyframes are captured by the electronic device at a plurality of camera poses, respectively, and the storage circuit is configured to store the plurality of camera poses, wherein when performing the global bundle adjustment to optimize the map, the computing circuit is further configured to:
adjust the plurality of camera poses and the virtual pose to reduce the sum of re-projection errors.

11. The electronic device of claim 9, wherein when performing the global bundle adjustment to optimize the map, the computing circuit is configured to calculate the sum of re-projection errors by performing the following operations:
projecting the first estimated coordinate onto real keyframes and virtual frames with first pixel points related to the first map point, so as to generate a plurality of first projection points;
calculating first re-projection errors between each of the first pixel points and a corresponding one of the plurality of first projection points;
projecting the second estimated coordinate onto real keyframes and virtual frames with second pixel points related to the second map point, so as to generate a plurality of second projection points;
calculating second re-projection errors between each of the second pixel points and a corresponding one of the plurality of second projection points; and
adding the first re-projection errors, the second re-projection errors and re-projection errors of other map points of the map, so as to generate the sum of re-projection errors.

12. The electronic device of claim 9, wherein a number of the plurality of virtual cameras is twelve, wherein optical axes of half of the plurality of virtual cameras intersect at the first intersection coordinate, and optical axes of another half of the plurality of virtual cameras intersect at the second intersection coordinate.

13. The electronic device of claim 9, wherein when the plurality of virtual cameras are generated, the first intersection coordinate, the second intersection coordinate, the first estimated coordinate and the second estimated coordinate are aligned with each other in an imaginary straight line.

14. The electronic device of claim 13, wherein when the plurality of virtual cameras are generated, a distance from the first estimated coordinate to the first intersection coordinate equals a distance from the second estimated coordinate to the second intersection coordinate.

15. The electronic device of claim 9, wherein the first distance value represents a real-world distance between the first marker and the second marker.

16. The electronic device of claim 9, wherein each of the plurality of distance values represents a real-word distance between two markers of a plurality of markers comprising the first marker and the second marker,
wherein the computing circuit is configured to generate a plurality of sets of virtual cameras, and the plurality of virtual cameras is a set of the plurality of sets of virtual cameras,
wherein each set of the plurality of sets of virtual cameras is separated into two groups kept separated from each other by a corresponding one of the plurality of distance values while performing the global bundle adjustment, so as to introduce the plurality of distance values into the global bundle adjustment.

17. A non-transitory computer readable storage medium, storing a plurality of computer readable instructions for controlling an electronic device comprising a computing circuit and a storage circuit configured to store a plurality of distance values and a map, the plurality of computer readable instructions, when being executed by the computing circuit, causing the computing circuit to perform:
identifying, from the map, a first map point with a first estimated coordinate and a second map point with a second estimated coordinate generated based on a first marker and a second marker, respectively;
generating, according to the first estimated coordinate and the second estimated coordinate, a plurality of virtual cameras controlled by a virtual pose and with optical axes intersected at a first intersection coordinate and a second intersection coordinate separated from each other by a first distance value of the plurality of distance values, wherein the plurality of virtual cameras provide a plurality of virtual frames indicating that the first marker and the second marker are observed at the first intersection coordinate and the second intersection coordinate, respectively; and
performing a global bundle adjustment to optimize the map, comprising adjusting the first estimated coordinate and the second estimated coordinate to reduce a sum of re-projection errors calculated according to a plurality of real keyframes and the plurality of virtual frames, wherein the electronic device is configured to perform positioning according to the optimized map.

18. The non-transitory computer readable storage medium of claim 17, wherein the plurality of real keyframes are captured by the electronic device at a plurality of camera poses, respectively, and the plurality of camera poses are stored in the electronic device, wherein performing the global bundle adjustment to optimize the map comprises:
adjusting the plurality of camera poses and the virtual pose to reduce the sum of re-projection errors.

19. The non-transitory computer readable storage medium of claim 17, wherein performing the global bundle adjustment to optimize the map comprises calculating the sum of re-projection errors, wherein calculating the sum of re-projection errors comprises:
projecting the first estimated coordinate onto real keyframes and virtual frames with first pixel points related to the first map point, so as to generate a plurality of first projection points;
calculating first re-projection errors between each of the first pixel points and a corresponding one of the plurality of first projection points;
projecting the second estimated coordinate onto real keyframes and virtual frames with second pixel points related to the second map point, so as to generate a plurality of second projection points;
calculating second re-projection errors between each of the second pixel points and a corresponding one of the plurality of second projection points; and
adding the first re-projection errors, the second re-projection errors and re-projection errors of other map points of the map, so as to generate the sum of re-projection errors.

20. The non-transitory computer readable storage medium of claim 17, wherein a number of the plurality of virtual cameras is twelve, wherein optical axes of half of the plurality of virtual cameras intersect at the first intersection coordinate, and optical axes of another half of the plurality of virtual cameras intersect at the second intersection coordinate.

\* \* \* \* \*